United States Patent [19]

Takami et al.

[11] Patent Number: 5,721,020

[45] Date of Patent: Feb. 24, 1998

[54] ULTRAVIOLET-CURING COATING COMPOSITION FOR CANS

[75] Inventors: Seiji Takami; Kazumi Fukudome, both of Hiratsuka, Japan

[73] Assignee: Kansai Paint Co., Ltd., Amagasaki, Japan

[21] Appl. No.: 724,398

[22] Filed: Oct. 2, 1996

[30] Foreign Application Priority Data

Oct. 2, 1995 [JP] Japan ................................. 7-254809
Mar. 21, 1996 [JP] Japan ................................. 8-064054

[51] Int. Cl.$^6$ ....................................................... C08F 2/48
[52] U.S. Cl. ........................... 427/508; 522/168; 522/170; 522/64; 522/77; 522/79; 522/129; 522/146
[58] Field of Search ............................. 522/168, 170, 522/64, 77, 79, 129, 146; 427/508

[56] References Cited

U.S. PATENT DOCUMENTS

| | | | |
|---|---|---|---|
| 3,835,003 | 9/1974 | Schlesinger | 204/159.11 |
| 4,026,705 | 5/1977 | Crivello et al. | 96/27 R |
| 4,080,274 | 3/1978 | Schlesinger | 204/159.18 |
| 4,154,872 | 5/1979 | Tsao et al. | 427/44 |
| 5,093,386 | 3/1992 | Bishop et al. | 522/96 |
| 5,463,084 | 10/1995 | Crivello et al. | 549/214 |

FOREIGN PATENT DOCUMENTS

| | | | |
|---|---|---|---|
| 37-13892 | 9/1962 | Japan . | |
| 37-14245 | 9/1962 | Japan . | |
| 7-53711 | 8/1993 | Japan | C08G 65/18 |

OTHER PUBLICATIONS

Nakashiro et al., "Method For Polymerizing Oxetanes", English translation of JP 37–14245 Sep. 17, 1962.
Geller et al., "The Relative Reactivity Of Cyclic Oxides In Cationic Polymerization. II", English translation Dec. 31, 1967.
Geller et al., "The Copolymerization Of Cyclic Oxides In The Presence Of Aluminum Isopropylate As Catalyst", English Translation Dec. 31, 1968.
Segawa et al., "Manufacturing Of Oxetane Polymers", English translation of JP 37–13892 Sep. 13, 1962.
Sasaki et al., "Active Energy Ray Hardening–Type Composition", English translation of JP 7–53711 Feb. 28, 1995.
Geller et al., "Copolymerization of Epoxides in the Presence of Aluminum Isopropylate Catalyst", Vysokomol. Soedin., 1878–82 1968.
Geller et al., "Relative Reactivity of Cyclic Oxides in Cationic Polymerization", Vysokomol. Soedin., 575–579 1967.

*Primary Examiner*—George F. Lesmes
*Assistant Examiner*—Steven H. VerSteeg
*Attorney, Agent, or Firm*—Wenderoth, Lind & Ponack

[57] ABSTRACT

An ultraviolet-curing coating composition for cans, which comprises:

(A) a cation-polymerizable compound, (B) a compound having at least one oxetane ring in the molecule, (C) a cationic initiator which generates a cation when irradiated with ultraviolet rays, and (D) a lubricity-imparting agent, wherein the proportions of the individual components are:

(A) 1–99 parts by weight, (B) 1–99 parts by weight, (C) 0.01–20 parts by weight per 100 parts by weight of the total of (A) and (B), and (D) 0.01–10 parts by weight per 100 parts by weight of the total of (A) and (B).

This ultraviolet-curing coating composition for cans can form a coating film superior in processability, adhesivity, hardness, mar resistance, etc. and particularly in appearance and retort resistance.

11 Claims, No Drawings

ULTRAVIOLET-CURING COATING COMPOSITION FOR CANS

The present invention, relates to an ultraviolet-curing coating composition for cans, capable of forming a coating film which can be cured by irradiation with ultraviolet rays and which, when cured, is superior in processability, adhesivity, hardness, mar resistance, etc. and particularly in appearance and retort resistance; and a process for producing a coated metal can by using the above composition.

As ultraviolet-curing coating compositions, there are known, for example, (1) cation-polymerizable coatings comprising a cation-polymerizable compound having an epoxy group(s) or a vinyl group(s) and a cationic initiator which generates a cation when irradiated with ultraviolet rays, and (2) radical-polymerizable coatings comprising a radical-polymerizable compound having a radical-polymerizable unsaturated group(s) and a radical initiator which generates a radical when irradiated with ultraviolet rays. However, the radical-polymerizable coatings, although having a feature of a high curing rate, have problems in that they are insufficient in intimate adhesion to substrate and processability, are inferior in surface curing because the curing is inhibited by oxygen and, when used for thin (2-8 μ) film formation, require an apparatus for nitrogen sealing or the like. Meanwhile, the cation-polymerizable coatings, although when compared with the radical-polymerizable coatings, having good adhesivity to substrate and good processability and requiring no apparatus for nitrogen sealing or the like, have problems in that they have a low curing rate and consequently are insufficient in film properties, particularly film appearance and retort resistance of film. The cation-polymerizable coatings further have a problem in that when they are coated directly on a metal material or a resin-laminated metal plate (e.g. a PET-laminated steel plate) and irradiated with ultraviolet rays, the resulting coating film shows gradual reduction in adhesivity with the lapse of time.

Hence, the present inventors made a study with an aim of developing an ultraviolet-curing coating composition capable of forming a coating film which can be cured by irradiation with ultraviolet rays, even in a thin film state, without requiring any special facility for nitrogen sealing or the like and which, when cured, is superior in properties such as processability, adhesivity, hardness, mar resistance and the like and particularly in appearance and retort resistance and shows no gradual reduction in adhesivity with the lapse of time. As a result, the present inventors found out that the above aim can be achieved by allowing a cation-polymerizable coating to contain a given amount of a photo cationically polymerizable compound having at least one oxetane ring in the molecule. The present invention has been completed based on the above finding.

The present invention provides an ultraviolet-curing coating composition for cans, which comprises:

(A) a cation-polymerizable compound, (B) a compound having at least one oxetane ring in the molecule, (C) a cationic initiator which generates a cation when irradiated with ultraviolet rays, and (D) a lubricity-imparting agent, wherein the proportions of the individual components are:

(A) 1–99 parts by weight, (B) 1–99 parts by weight, (C) 0.01–20 parts by weight per 100 parts by weight of the total of (A) and (B), and (D) 0.01–10 parts by weight per 100 parts by weight of the total of (A) and (B).

The present invention further provides a process for producing a coated metal can, which comprises coating the above ultraviolet-curing coating composition for cans on a metal plate, a resin film-laminated metal plate or a metal can obtained by molding of said plate and irradiating the resulting plate or can with ultraviolet rays to cure the coated composition.

The composition of the present invention is a coating composition for cans which, when irradiated with ultraviolet rays, gives rise to cationic polymerization and subsequent curing. The present coating composition and the applications thereof are hereinafter described in detail.

Cation-polymerizable compound (A)

The cation-polymerizable compound (A) is a monomer which can give rise to ion polymerization in the presence of a cation as a chain carrier (a growth seed), and includes vinyl compounds [having a carbon-to-carbon double bond(s)] which can give rise to vinyl cation polymerization in the presence of a carbon cation as a growth seed and heterocyclic compounds which can give rise to ring-opening cation polymerization in the presence of an onium ion as a growth seed. The cation-polymerizable compound (A), however, excludes the compound (B) having at least one oxetane group in the molecule.

The cation-polymerizable compound (A) usable in the present invention includes, for example, the following compounds (a) to (d).

(a) Compounds having an epoxy group(s)

For example, dicyclopentadiene dioxide, limonene dioxide, 4-vinyl cyclohexene dioxide, (3,4-epoxycyclohexyl)methyl 3,4-epoxycyclohexanecarboxylate, di(3,4-epoxycyclohexyl) adipate, phenyl glycidyl ether, bisphenol A type epoxy resin, halogenareal bisphenol A type epoxy resin, bisphenol F type epoxy resin, o-, m- or p-cresol novolac type epoxy resin, phenolic novolac type epoxy resin and polyglycidyl ether of polyhydric alcohol.

(b) Vinyl compounds

For example, aromatic vinyl compounds such as styrene, a-methylstyrene, p-chloromethylstyrene, vinyltoluene and the like; substituted or unsubstituted alkyl or cycloalkyl vinyl ethers such as n-butyl vinyl ether, isobutyl vinyl ether, cyclohexyl vinyl ether, hydroxybutyl vinyl ether and the like; alkenyl vinyl ethers such as allyl vinyl ether, ethenyl vinyl ether, 1-methyl-2-propenyl vinyl ether and the like; substituted or unsubstituted aryl vinyl ethers such as phenyl vinyl ether, p-methoxyphenyl vinyl ether and the like; alkylene or cycloalkylene divinyl ethers such as butanediol divinyl ether, triethylene glycol divinyl ether, cyclohexanediol divinyl ether and the like; substituted or unsubstituted aralkylene divinyl ethers such as 1,4-benzenedimethanol divinyl ether, N,N-m-chlorophenyldiethanolamine divinyl ether, m-phenylene-bis (ethylene glycol) divinyl ether and the like; arylene divinyl ethers such as hydroquinone divinyl ether, resorcinol divinyl ether and the like; and cation-polymerizable nitrogen-containing compounds such as N-vinylcarbazole, N-vinylpyrrolidone and the like.

(c) Bicyclo ortho ester compounds

For example, 1-phenyl-4-ethyl-2,6,7-trioxabicyclo-[2,2,2]-octane and 1-ethyl-4-hydroxymethyl-2,6,7-trioxabicyclo-[2,2,2]-octane.

(d) Spiro ortho carbonate compounds

For example, 1,5,7,11-tetraoxaspiro-[5,5]-undecane, 3,9-di benzyl-1,5,7,11 -tetraoxaspiro-[5,5]-undecane, 1,4,6-trioxaspiro-[4,4]-nonane, 2-methyl-1,4,6-trioxaspiro-[4,4]-nonane and 1,4,6-trioxaspiro-[4,5]-decane.

Of the above compounds (a) to (d), the compounds (a) having an epoxy group(s) in the molecule are preferred, and compounds having an alicyclic epoxy group(s) in the molecule are particularly preferred.

Herein, "alicyclic epoxy group" refers to an epoxy group present in an alicyclic compound, formed by the linkage of two carbon atoms (ordinary adjacent two carbon atoms) of the alicyclic ring of the all cyclic compound, via one oxygen atom.

The compound having an alicyclic epoxy group(s) in the molecule, preferably used in the present invention can be a compound having at least one, preferably one or two alicyclic epoxy groups in the molecule. Specific examples of such a compound include dicyclopentadiene dioxide, limonene dioxide, di(3,4-epoxycyclohexyl) adipate, (3,4-epoxycyclohexyl)methyl-3,4-epoxycyclohexanecarboxylate, (3,4-epoxy-6-methylcyclohexyl)methyl 3,4-epoxy-6-methylcyclohexanecarboxylate, ethylene-1,2-di (3,4-epoxycyclohexanecarboxylic acid) ester and the compounds represented by the following formula (1), (2) or (3). These compounds can be used singly or in combination of two or more compounds.

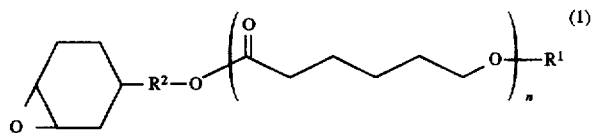

(wherein $R^1$ is a hydrogen atom, an alkyl group of 1–8 carbon atoms which may have an epoxy group(s), or an acyl group of 1–12 carbon atoms which may have an epoxy group(s); $R^2$ is an alkylene group of 1–6 carbon atoms; and n is an integer of 0–15),

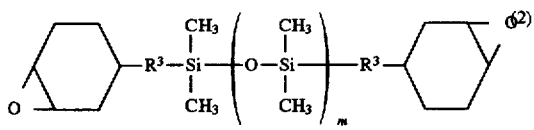

(wherein two $R^3$s may be the same or different and are each independently an alkylene group of 1–6 carbon atoms; and m is an integer of 0–25),

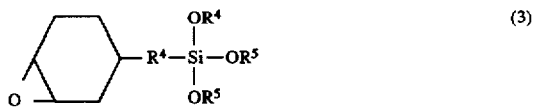

(wherein $R^4$ is an alkylene group of 1–6 carbon atoms; and three $R^5$s may be the same or different and are each independently an alkyl group of 1–4 carbon atoms).

In the formula (1), the alkyl group which can be taken by $R^1$, is straight chain branched chain or cyclic and includes, for example, methyl, ethyl, n- or iso-propyl, n-, iso-or tertiary-butyl, octyl and cyclohexyl groups. The alkyl group which has an epoxy group(s), includes, for example, a 3,4-epoxycyclohexylmethyl group. The acyl group which can be taken by $R^1$, is a group represented by RCO (wherein R is an organic group such as alkyl, alkenyl, cycloalkyl, aryl, aralkyl or the like), and includes, for example, formyl, acetyl, propionyl, butyroyl, octanoyl, lauroyl, acryloyl, methacryloyl and benzoyl groups. The acryl group which has an epoxy group(s), includes, for example, a 3,4-epoxycyclohexanecarbonyl group. The alkylene group which can be taken by $R^2$ is straight chain branched chain or cyclic and includes, for example, methylene, ethylene, 1,2- or 1,3-propylene, butylene and cyclohexylene groups.

Typical examples of the compound represented by the formula (1) wherein n is 0, include 3,4-epoxycyclohexylmethyl 3,4-epoxycyclohexanecarboxylate, 3,4-epoxycyclohexylmethyl acrylate, 3,4-epoxycyclohexylmethyl methacrylate, 3,4-epoxycyclohexylmethyl alcohol and di(3,4-epoxycyclohexylmethyl) ether. Typical examples of the compound represented by the formula (1) wherein n is an integer of 1–15 (n is preferably an integer of 1–6), include those compounds of the formula (1) wherein $R^1$ is a hydrogen atom and $R^2$ is a methylene group, or $R^1$ is a 3,4-epoxycyclohexanecarbonyl group and $R^2$ is a methylene group, or $R^1$ is an acryloyl group and $R^2$ is a methylene group, or $R^1$ is a methacryloyl group and $R^2$ is a methylene group.

In the formula (2), the alkylene group represented by $R^3$ is straight chain, branched chain or cyclic and includes, for example, methylene, ethylene, 1,2- or 1,3-propylene, butylene and cyclohexylene groups. Typical examples of the compound represented by the formula (2) include those compounds of the formula (2) wherein two $R^3$s are each a 1,2-ethylene group and m is an integer of 0–25.

In the formula (3), the alkylene group represented by $R^4$ is straight chain, branched chain or cyclic and includes, for example, methylene, ethylene, 1,2- or 1,3-propylene, butylene and cyclohexylene groups. Typical examples of the compound represented by the formula (3) include those compounds of the formula (3) wherein $R^4$ is an ethylene group and three $R^5$s are each a methyl group, or $R^4$ is a 1,2- or 1,3-propylene group and three $R^5$s are each a methyl group.

Of the above-mentioned compounds having an alicyclic epoxy group(s) in the molecule, particularly preferable compounds include 3,4-epoxycyclcohexylmethyl 3,4-epoxycyclohexanecarboxylate, 3,4-epoxycyclohexylmethyl alcohol, 3,4-epoxycyclohexylethyltrimethoxysilane and compounds represented by the following formula:

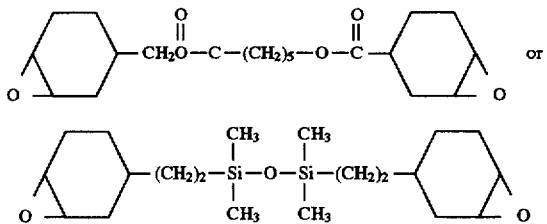

Compound (B) having an oxetane ring(s) in the molecule

The compound (B) used in the present coating composition is a compound having, in the molecule, at least one, preferably 1–15, more preferably 1–4 oxetane rings

which can give rise to ring-opening polymerization when irradiated with ultraviolet rays in the presence of a cationic initiator (the compound is hereinafter referred to as "oxetane compound"). Specific examples of the oxetane compound include compounds represented by the following formula (4) and compounds represented by formula (10), (11) or (12) shown later.

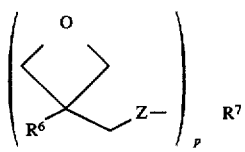
(4)

In the formula (4), $R^6$ is a hydrogen atom, a fluorine atom, a straight chain, branched chain or cyclic alkyl group of 1–6 carbon atoms (e.g. a methyl, ethyl, n- or iso-propyl, n-, iso- or tertiary-butyl, pentyl, hexyl or cyclohexyl group), a straight chain or branched chain fluoroalkyl group of 1–6 carbon atoms (e.g. a monofluoromethyl, difluoromethyl, trifluoromethyl, 2,2,2-trifluoroethyl, perfluoroethyl, perfluoropropyl, perfluorobutyl or perfluorohexyl group), an allyl group, an aryl group (e.g. a phenyl, naphthyl, tolyl or xylyl group), an aralkyl group (e.g. a benzyl or phenethyl group), a furyl group or a thienyl group; $R^7$ has a valency corresponding to the value of p and is a hydrogen atom or a mono- to tetravalent organic group; Z is an oxygen or sulfur atom; and p is an integer of 1–4.

The mono- to tetravalent organic group represented by $R^7$ includes mono- to tetravalent straight chain, branched chain or cyclic hydrocarbon groups of 1–30 carbon atoms which may contain at least one hetero atom selected from O, S, N and F and/or a siloxane bond(s).

Specific examples of the monovalent organic group which can be taken by $R^7$ include a straight chain, branched chain or cyclic alkyl group of 1–6 carbon atoms (e.g. a methyl, ethyl, n- or iso-propyl n-, iso- or tertiary-butyl, pentyl, hexyl or cyclohexyl group), a straight chain or branched chain alkoxyalkyl group of 1–6 carbon atoms (e.g a methoxyethyl, ethoxyethyl, butoxyethyl or ethoxymethyl group), a straight chain or branched chain fluoroalkyl group of 1–6 carbon atoms (e.g. a monofluoromethyl, difluoromethyl, trifluoromethyl, 2,2,2-trifluoroethyl, perfluoroethyl, perfluoropropyl, perfluorobutyl or perfluorohexyl group), an allyl group, an aryl group (e.g. a phenyl, naphthyl, tolyl or xylyl group), an aralkyl group (e.g. a benzyl or phenethyl group), a furyl group, a thienyl group and an epoxy-containing group (e.g. a glycidyl or 3,4-epoxycyclohexylmethyl group).

Specific examples of the divalent organic group which can be taken by $R^7$ include a straight chain, branched chain or cyclic alkylene group (particularly, an alkylene group of 1–15 carbon atoms such as methylene, ethylene, 1,2- or 1,3-propylene, butylene or cyclohexylene), a poly (alkyleneoxy) group having 4–30, preferably 4–8 carbon atoms [e.g. a poly(ethyleneoxy) or poly(propyleneoxy) group], a phenylene group, a xylylene group, a group represented by the following formula (5) or (6):

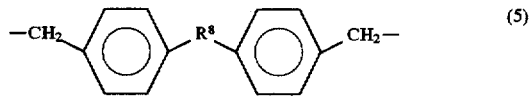
(5)

[wherein $R^8$ is O, S, $CH_2$, NH, SO, $SO_2$, $C(CF_3)_2$ or $C(CH_3)_2$],

(6)

(wherein $R^9$ is an alkylene group of 1–6 carbon atoms, an arylene group or a direct bond),
and a group of 2–30, preferably 2–6 carbon atoms wherein two alkylene groups are bonded via a (poly)siloxane chain [e.g. such a group wherein the alkylene groups are each an ethylene group or a propylene group and the (poly)siloxane chain has a molecular weight of 130–15,000, particularly 130–500; preferably, a group represented by the following formula (7)]:

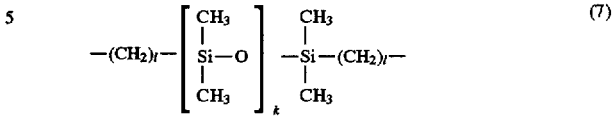
(7)

(wherein k is an integer of 1–6, and l is 2 or 3).

Specific examples of the tri- or tetra-valent organic group which can be taken by $R^7$, include those groups represented by the following formula (8) to (11):

(8)

(wherein $R^{10}$ is an alkyl group of 1–6 carbon atoms, for example, an ethyl group),

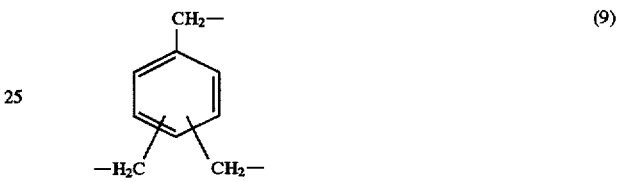
(9)

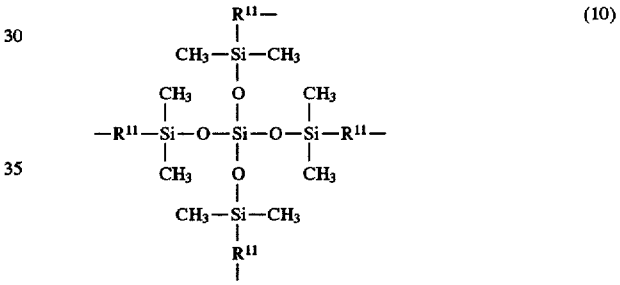
(10)

(wherein four $R^{11}$s may be the same or different and are each independently an alkylene group of 1–6 carbon atoms, for example, an ethylene group),

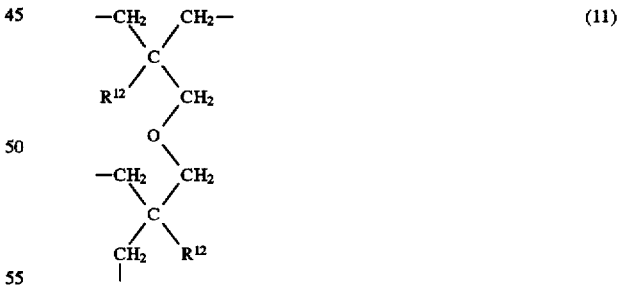
(11)

(wherein two $R^{12}$s may be the same or different and are each independently a hydrogen atom, a fluorine atom, an alkyl group of 1–6 carbon atoms, a fluoroalkyl group of 1–6 carbon atoms, an allyl group, an aryl group, a furyl group or a thienyl group).

Of the mono- to tetra-valent organic groups which can be taken by $R^7$, mono- or di-valent organic groups [i.e. p of the formula (4) is 1 or 2] are preferred. Particularly preferred are an alkyl group of 1–6 carbon atoms, such as methyl, ethyl, propyl, butyl, hexyl or the like; an allyl group; a glycidyl group; a vinyl group; an alkoxyalkyl group of 1–6 carbon atoms, such as ethoxyethyl, methoxyethyl or the like; a benzyl group; an alkylene group of 1–6 carbon atoms, such as methylene, ethylene, propylene, butylene, hexylene or the like; a p-xylylene group; and a group represented by the following group:

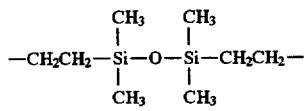

In the formula (4), $R^6$ is preferably a hydrogen atom; an alkyl group of 1–6 carbon atoms, such as methyl, ethyl, propyl, butyl, hexyl or the like; or an allyl group. $R^6$ is particularly preferably a hydrogen atom, a methyl group or an ethyl group.

The compound (B) having at least one oxetane ring in the molecule is preferably:

(B-1) a compound having, in the molecule, at least one, preferably one oxetane ring and at least one, preferably one hydroxyl group, or (B-2) a compound having, in the molecule, at least two oxetane rings, or an oxetane ring(s) and an epoxy group(s).

The oxetane compound (B-1) includes, for example, a compound of the formula (4) wherein p is 1 and $R^7$ is a hydrogen atom, particularly a compound represented by the following formula (4-1):

(wherein $R^{61}$ is a hydrogen atom, a fluorine atom, a straight chain or branched chain alkyl group of 1–6 carbon atoms, a straight chain or branched chain fluoroalkyl group of 1–6 carbon atoms, or an allyl group).

Typical examples of the compound represented by the formula (4-1) include a compound of the formula (4-1) wherein $R^{61}$ is an ethyl group.

The oxetane compound (B-2), when containing at least two oxetane rings in the molecule (this compound is hereinafter referred to as "polyoxetane compound"); includes a compound of the formula (4) wherein p is an integer of 2–4. Particularly preferable as such a compound is a compound represented by the following formula (4-2):

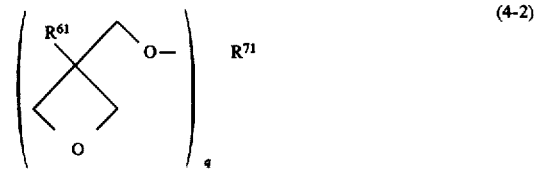

(wherein $R^{61}$ has the same definition as given above; $R^{71}$ is the same as the di- to tetra-valent organic group defined for $R^7$ in the formula (4); and q is an integer of 2–4).

Typical examples of the compound represented by the formula (4-2) include those compounds of the formula (4-2) wherein $R^{61}$ is an ethyl group and $R^{71}$ is a 1,4-tetramethylene group, a dodecamethylene group, an o-, m- or p-xylylene group, a group represented by the formula (6) wherein $R^9$ is an ethylene group, or a group represented by the formula (7).

The polyoxetane compound includes, besides the compounds represented by the formula (4-2), compounds represented by the following formula (12), (13) or (14):

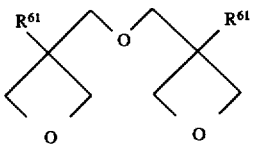

(wherein two R61s, which may be the same or different, each have the same definition as given above and are preferably an ethyl group).

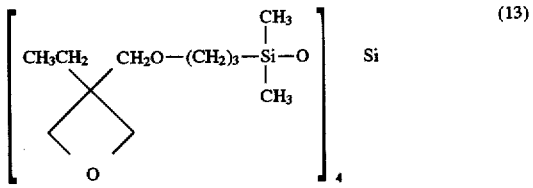

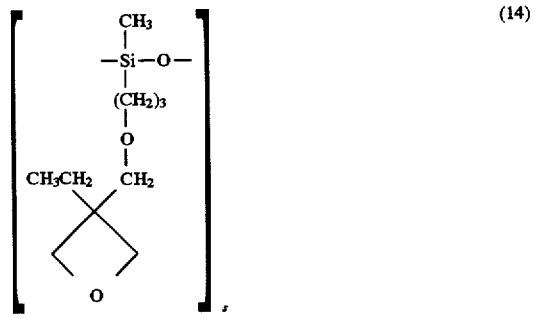

(wherein s is an integer of 25–200).

The oxetane compound (B-2), when containing an oxetane ring(s) and an epoxy group(s) in the molecule (such a compound is hereinafter referred to as "epoxy-containing oxetane compound"), includes a compound containing, in the molecule, one oxetane ring and one epoxy group. An example thereof is a compound represented by the following formula (15):

(wherein $R^{13}$ is an epoxy-containing group, and $R^{61}$ has the same definition as given above).

Typical examples of the epoxy-containing oxetane compound include those compounds of the formula (15) wherein $R^{61}$ is an ethyl group and $R^{13}$ is a glycidyl group or a 3,4-epoxycyclohexylmethyl group.

The oxetane compound (B) can be used singly or in combination of two or more kinds. Preferably, the compound (B-1) and the compound (B-2) are used in combination. In the case of combination use, the proportions of the compound (B-1) and the compound (B-2) can be each independently 5–60 parts by weight, preferably 5–40 parts by weight, more preferably 10–30 parts by weight per 100 parts by weight of the total of the cation-polymerizable compound (A) and the oxetane compounds (B-1) and (B-2). Cationic initiator (C)

The cationic initiator (C) used in the present invention is a compound which generates a cation when irradiated with ultraviolet rays, to initiate polymerization, and includes, for example, a hexafluoroantimonate (salt), a pentafluorohydroxyantimonate (salt), a hexafluorophosphate (salt), a hexafluoroarsenate (salt) and other cationic initiators, each represented by one of the following formulas (I) to (XV).

$$Ar_2I^+ \cdot X^- \quad \text{(I)}$$

(wherein Ar is an aryl group, for example, a phenyl group; and $X^-$ is $PF_6^-$, $SbF_6^-$ or $AsF_6^-$), $$Ar_3S^+ \cdot X^- \quad \text{(II)}$$

(wherein Ar and $X^-$ each have the same definition as given above),

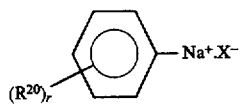

(III)

(wherein $R^{20}$ is an alkyl group of 1–12 carbon atoms or an alkoxy group of 1–12 carbon atoms; r is an integer of 0–3; and X has the same definition as given above),

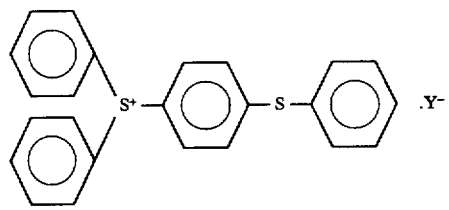

(IV)

(wherein $Y^-$ is $PF_6^-$, $SbF_6^-$, $AsF_6^-$ or $SbF_5(OH)^-$),

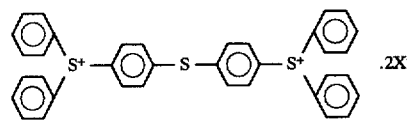

(V)

(wherein $X^-$ has the same definition as given above),

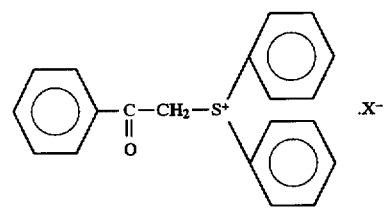

(VI)

(wherein $X^-$ has the same definition as given above),

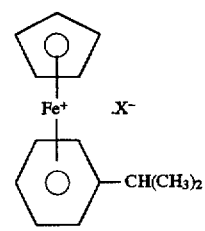

(VII)

(wherein $X^-$ has the same definition as given above),

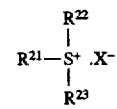

(VIII)

(wherein $R^{21}$ is an aralkyl group of 7–15 carbon atoms or an alkenyl group of 3–9 carbon atoms; $R^{22}$ is a hydrocarbon group of 1–7 carbon atoms or a hydroxyphenyl group; $R^{23}$ is an alkyl group of 1–5 carbon atoms which may contain an oxygen atom(s) or a sulfur atom(s); and $X^-$ has the same definition as given above),

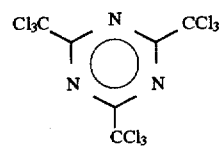

(IX)

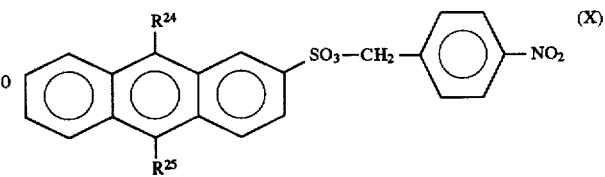

(X)

(wherein $R^{24}$ and $R^{25}$ are each independently an alkyl group of 1–12 carbon atoms or an alkoxy group of 1–12 carbon atoms),

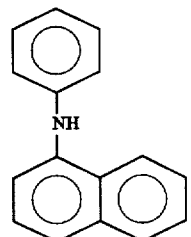

(XI)

(XII)

(wherein $R^{24}$ and $R^{25}$ each have the same definition as given above),

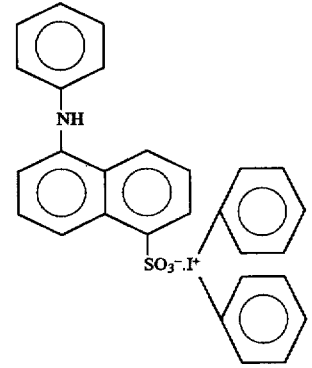

(XIII)

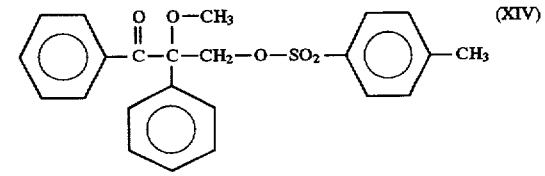

(XIV)

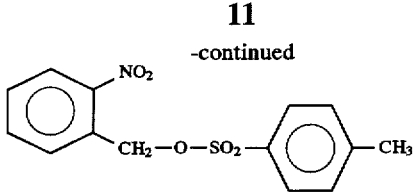

The cationic initiator (C) is available as commercial products. Such products include, for example, Cyracure UVI-6970, Cyracure UVI-6974 and Cyracure UVI-6990 (these are products of Union Carbide Corporation of U.S.), Irgacure 264 (a product of Ciba Geigy Co.) and CIT-1682 (a product of Nippon Soda Co., Ltd.).

Of the above-mentioned cationic initiators, compounds having hexafluorophosphate anion ($PF_6^-$) are preferred in view of the toxicity, general-purpose applicability, etc.

Lubricity-imparting agent (D)

In the present coating composition, the lubricity-imparting agent (D) is used in order to improve lubricity of a coating film formed. It includes, for example, waxes such as fatty acid ester wax (which is an ester of a polyol compound(s) and a fatty acid(s)), silicon-based wax, fluorine-containing wax, polyolefin wax, animal wax, vegetable wax and the like.

The polyol compound, which is a raw material of the fatty acid ester wax, includes ethylene glycol, diethylene glycol, triethylene glycol, tetraethylene glycol, 1,3- or 1,4-butanediol, neopentyl glycol, 1,6-hexanediol, glycerine, di- or higher polyglycerine, trimethylolpropane, pentaerythritol, dipentaerythritol, etc. Of these compounds, polyol compounds having three or more hydroxyl groups in the molecule are preferable. Especially preferable examples are polyglycerine, trimethylolpropane and pentaerythritol being particularly preferred.

The fatty acid, which is another raw material of the fatty acid ester wax, includes saturated or unsaturated fatty acids. It is preferably a fatty acid of 6–32 carbon atoms. Preferable specific examples of the fatty acid include saturated fatty acids such as caprylic acid, pelargonic acid, capric acid, lauric acid, myristic acid, palmitic acid, stearic acid, arachic acid, behenic acid, cerotic acid, montanic acid, melissic acid and the like; and unsaturated fatty acids such as caproleic acid, undecylenic acid, palmitoleic acid, oleic acid, linolic acid, linolenic acid, eleostearic acid, cetoleic acid, erucic acid, licanic acid, ricinoleic acid, arachidonic acid and the like.

The fatty acid ester wax is preferably such a fatty acid ester wax wherein at least ⅓ of the total hydroxyl groups of the polyol compound is esterified with the fatty acid.

The silicon-based wax includes, for example, BYK-300, BYK-320 and BYK-330 (these are products of BYK Chemie Co.); Silwet L-77, Silwet L-720 and Silwet L-7602 (these are products of Nippon Unicar Co., Ltd.); Paint Additive 29, Paint Additive 32 and Paint Additive M (these are products of Dow Corning Corporation); and Shin-Etsu Silicone KF-96 (a product of Shin-Etsu Chemical Co., Ltd.). The fluorine-based wax includes, for example, Shamrock Wax SST-1MG, Shamrock Wax SST-3 and Shamrock Wax Fluoroslip 231 (these are products of Shamrock Chemicals Co.); and POLYFLUO 120, POLYFLUO 150 and POLYFLUO 400 (these are products of Micro Powders Co.).

The polyolefin wax includes, for example, Shamrock Wax S-394 and Shamrock Wax S-395 (these are products of Shamrock Chemicals Co.); Heohst Wax PE-520 and Heohst Wax PE-521 (these are products of Hechst Co.); and Mitsui Highwax (a product of Mitsui Petrochemical Industries, Ltd.). The animal wax includes, for example, lanolin and bees wax. The vegetable wax includes, for example, carnauba wax and Japan wax.

The lubricity-imparting agent (D) can be used singly or in combination of two or more kinds.

The silicon-based wax can impart excellent lubricity after film curing but before retort treatment. The fatty acid ester wax can impart excellent lubricity after film curing and retort treatment. Therefore, it is preferable to use at least one wax selected from the silicon-based wax and the fatty acid ester wax. Combined use of 0.01–5 parts by weight of the silicon-based wax and 0.1–5 parts by weight of the fatty acid ester wax per 100 parts by weight of the total of the cation-polymerizable compound (A) and the oxetane compound (B) can provide a coating film having excellent lubricity before and after retort treatment.

Other additives

The coating composition of the present invention can further comprise as necessary, besides the essential components (A), (B), (C) and (D), a sensitizer; a pigment (e.g. coloring pigment or extender pigment) or a dye, of such an amount that curing is not significantly hindered; a modifying resin (e.g. polyol resin, phenolic resin, acrylic resin, polyester resin, polyolefin resin, epoxy resin or epoxidized polybutadiene resin); organic resin fine particles; a solvent; and so forth.

The sensitizer is used in order for the present composition to have improved curability by ultraviolet rays and includes, for example, pyrene, perylene, Acridine Orange, thioxanthone, 2-chlorothioxanthone and benzoflavin. The sensitizer is used in an amount of generally 10 parts by weight or less, preferably 3 parts by weight or less per 100 parts by weight of the total of the cation-polymerizable compound (A) and the oxetane compound (B).

When a modifying resin is used, the preferable amount used is generally 0.1–50 parts by weight, particularly 5–20 parts by weight per 100 parts by weight of the total of the cation-polymerizable compound (A) and the oxetane compound (B). As the modifying resin, an epoxidized polybutadiene resin is particularly effective for the improvement of film processability, adhesivity, etc.

The organic resin fine particles preferably have particles diameters of 50–500 µm and are, for example, acrylic resin fine particles which are internally crosslinked three-dimensionally. The organic resin fine particles include, for example, those obtained by grinding an organic polymer into fine particles, or by conducting emulsion polymerization in water in the presence of an emulsifier and drying and grinding the resulting polymer fine particles, or by conducting dispersion polymerization in an organic solvent in the presence of a polymer stabilizer and drying and grinding the resulting polymer fine particles. Use of the organic resin fine particles in the present coating composition can provide a coating film of improved adhesivity and processability. When organic resin fine particles are used, the preferable amount used is generally 0.1–50 parts by weight, particularly 1–10 parts by weight per 100 parts by weight of the total of the cation-polymerizable compound (A) and the oxetane compound (B).

Coating composition

The coating composition of the present invention can be prepared by mixing the above-mentioned individual components and stirring them so as to obtain a uniform coating composition. For example, the individual components are mixed and then stirred by the use of a stirrer (e.g. a dissolver) with heating as necessary to, for example, about 50° C. until a uniform composition is obtained (for example, about 10 minutes).

The proportions of the cation-polymerizable compound (A), the oxetane compound (B), the cationic initiator (C) and the lubricity-imparting agent (D) used can be as follows.

The proportion of the cation-polymerizable compound (A) can be 1–99 parts by weight, preferably 20–90 parts by weight, more preferably 40–80 parts by weight; and the proportion of the compound (B) can be 1–99 parts by weight, preferably 10–80 parts by weight, more preferably 20–60 parts by weight. In the above proportions, the total of the compound (A) and the compound (B) must be 100 parts by weight.

The proportion of the cationic initiator (C) can be 0.01–20 parts by weight, preferably 0.1–10 parts by weight, more preferably 1–5 parts by weight per 100 parts by weight of the total of the compound (A) and the compound (B). The proportion of the lubricity-imparting agent (D) can be 0.01–10 parts by weight, preferably 0.1–5 parts by weight, more preferably 0.5–3 parts by weight per 100 parts by weight of the total of the compound (A) and the compound (B).

The ultraviolet-curing coating composition for cans has ultraviolet-curability, and can form a cured film by being coated on a metal plate, a resin film-laminated metal plate or a metal can formed by molding of any of these metal plates and then being irradiated with ultraviolet rays. The former metal plate includes plates of tinplate, aluminum, tin-free steel, iron, zinc, copper, zinc-plated steel, steel plated with a zinc-other metal alloy, or the like, which can be molded into a metal can. These metal plates may have been subjected to a chemical treatment such as zinc phosphate treatment or chromate treatment. The resin film-laminated metal plate includes those obtained by laminating, on the former metal plate, a film of a resin such as polyester resin (e.g. polyethylene terephthalate), polyolefin resin (e.g. polyethylene or polypropylene), polyamide resin, epoxy resin, polyvinyl chloride or the like. The thickness of the present coating composition applied can be appropriately determined depending upon the application but can be in the range of generally about 2–20 μm, preferably about 2–8 μm in terms of "as dried" film thickness.

The ultraviolet-curing coating composition for cans according to the present invention can be applied by a coating method such as roll coating, spray coating, bar coating, roller coating, silk screen printing or the like. The resulting coating film is subjected to heating or the like for solvent removal when the composition contains a solvent, and then is irradiated with ultraviolet rays for curing. The conditions for irradiation can be appropriately varied depending upon the kind of coating composition used, the thickness of film formed, etc.

The appropriate wavelength of the ultraviolet rays applied is generally 200–600 nm. A UV source having a wavelength of high sensitivity can appropriately be selected depending upon, for example, the kind of cationic initiator used.

The UV source usable includes, for example, a high pressure mercury lamp, an ultrahigh pressure mercury lamp, a xenon lamp, a carbon arc, a metal halide lamp and a sunlight. The appropriate UV amount applied is generally 10–1,000 mJ/cm$^2$, particularly 50–500 mJ/cm$^2$.

The ultraviolet-curing coating composition for cans according to the present invention comprises the cation-polymerizable compound (A) and the oxetane compound (B) as the film-forming components and can be effectively cured by cationic polymerization in the presence of a cationic initiator by the use of ultraviolet rays, without requiring any apparatus for nitrogen sealing or the like. The resulting coating film is superior in processability, adhesivity, hardness, mar resistance, etc. even in a thin film state and moreover in film appearance and retort resistance (these film properties are necessary for coatings used for cans). Further, the coating film after UV irradiation shows no reduction in adhesivity with the lapse of time. Therefore, the present coating composition is suitable particularly as a coating for outer surface of can.

The present invention is hereinafter described more specifically by way of Examples. In the following, parts and % are by weight.

Production of oxetane compounds (B)

Production Example 1

In a flask equipped with a stirrer and a cooler were placed 67.0 g (0.5 mole) of trimethylolpropane, 59.0 g (0.5 mole) of diethyl carbonate and a solution of 0.05 g of potassium hydroxide dissolved in 2 ml of anhydrous alcohol. The flask contents were refluxed until the flask inside temperature reached a temperature lower than 105° C. Then, distillation was conducted with the distillation head temperature kept at 76°–78° C. Distillation was continued until the flask inside temperature became 145° C. Thereafter, the flask inside pressure was gradually lowered to 15 mmHg while the flask inside temperature was being kept at 140–150° C. When the flask inside was heated to a temperature higher than 180° C., carbon dioxide vaporized quickly and most of the product was distilled at 100°–160° C. Redistillation was conducted to obtain 43.9 g of 3-ethyl-3-hydroxymethyloxetane.

Production Example 2

In a flask equipped with a stirrer were placed a solution of 23.2 g (0.2 mole) of 3-ethyl-3-hydroxy-methyloxetane dissolved in 48.4 g (0.4 mole) of allyl bromide and 50 g of an aqueous solution containing 50% by weight of potassium hydroxide. Thereto was added 1.0 g of tetra-n-butylammonium bromide at 0° C. with vigorous stirring. After 24 hours, 100 ml of dichloromethane and 100 ml of water were added. The resulting organic phase was washed with water twice, dried over magnesium sulfate, and filtered. The filtrate was treated by the use of a rotary evaporator to remove the solvent in the filtrate. The residue was purified by vacuum distillation to obtain 28.6 g of 3-ethyl-3-allyloxymethyloxetane.

Production Example 3

In a flask equipped with a stirrer and a cooler were placed 25.0 g (0.1 mole) of ditrimethylolpropane, 23.6 g (0.2 mole) of diethyl carbonate and 5.0 g of potassium carbonate. The flask contents were refluxed until the flask inside temperature reached a temperature lower than 120° C. Then, the flask contents were subjected to distillation with the distillation head temperature kept at 76°–78° C. Distillation was continued until the flask inside temperature became 180° C., and the flask contents became viscous owing to the formation of a polymer. When the flask inside was heated to a temperature higher than 220° C., the viscous mixture returned to a fluid liquid and carbon dioxide vaporized quickly. Then, when the flask inside pressure was gradually reduced to 15 mmHg, most of the product was distilled at 120°–170° C. Redistillation was conducted to obtain 8.9 g of an oxetane compound represented by the following formula (16).

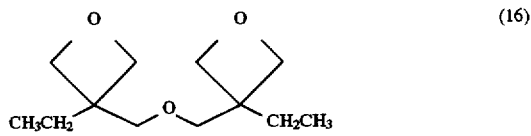

(16)

Production of ultraviolet-curing coating compositions for cans

EXAMPLE 1

There were mixed 60 parts of 3,4-epoxy-cyclohexylmethyl 3,4-epoxycyclohexanecarboxylate; 20 parts of a cation-polymerizable compound represented by the following formula (17):

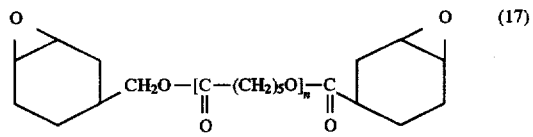

(wherein n is a number of average 3); 20 parts of the 3-ethyl-3-hydroxymethyloxetane obtained in Production Example 1; 6 parts of Cyracure UVI-6990 (a photo- and cation-polymerization initiator having $PF_6^-$, a product of Union Carbide Corporation of U.S.); 1 part of a fatty acid ester wax (a) obtained by reacting 1 mole of decaglycerine ether (which is a polyglycerine having a polymerization degree of 10 and which has 12 hydroxyl groups in the molecule) and 10 moles of lauric acid; and 0.2 part of Paint Additive M (a silicon-based wax, a product of Dow Corning Corporation). The mixture was stirred at 50° C. for 20 minutes to obtain an ultraviolet-curing coating composition for cans.

EXAMPLES 2–6

Comparative Examples 1–3

Operations were conducted in the same manner as in Example 1 except that the components shown in Table 1 were used in the proportions shown in Table 1, whereby various ultraviolet-curing coating compositions for cans were obtained.

Comparative Example 4

An operation was conducted in the same manner as in Example 1 except that neither fatty acid ester wax (a) nor Paint Additive M was used, whereby an ultraviolet-curing coating composition for cans was obtained.

Preparation of coated plates for testing

Each of the coating compositions obtained in Examples 1–6 and Comparative Examples 1–4 was coated on a tin-free steel plate (TFS) of 0.20 mm in thickness and a PET steel plate obtained by heat-and pressure-laminating a homo PET (homo polyethylene terephthalate) sheet of 12 μm in thickness on the above TFS, so as to give a coating film thickness (as dried) of 5 μm. Each of the coated compositions was irradiated with ultraviolet rays by the use of a high pressure mercury lamp (160 W/cm) from a distance of 15 cm so that the UV amount applied became 100 mJ/cm² or 150 mJ/cm², whereby each coated composition was cured to obtain each coated plate for testing.

Each coated plate for testing was tested by the following test methods. Incidentally, all the tests were conducted at 20° C.; and 20° gloss, in-retort extraction and film appearance were measured only for coated plates using the PET steel plate.

Test methods

Pencil hardness: Pencil scratching was conducted on the film of a coated plate for testing, according to JIS K 5400 8.4.2 (1990). Evaluation was made by the breakage method.

Impact resistance (DuPont method): Impact molding was applied to the uncoated side of a coated plate for testing, by the use of a DuPont impact tester under the conditions of diameter of impact point=⅜ in., falling weight=500 g and falling height=50 cm. The molded portion was observed by the use of a microscope and evaluated according to the following yardstick.

⊚: either cracking nor film peeling is seen.
○: Slight cracking is seen but no film peeling is seen.
Δ: Considerable cracking is seen but no film peeling is seen.
X: Film peeling is seen.

Mar resistance: A friction test was conducted for a coated plate for testing, by the use of a Bauden friction tester (a stick-slip tester of Soda type, a product of ShinKo Engineering Co., Ltd.) under the conditions of friction portion

TABLE 1

| Components | Examples | | | | | | Comparative Examples | | |
|---|---|---|---|---|---|---|---|---|---|
|  | 1 | 2 | 3 | 4 | 5 | 6 | 1 | 2 | 3 |
| 3,4-Epoxycyclohexylmethyl 3,4-epoxycyclohexanecarboxylate | 60 | 30 | 60 | 80 | 80 | 50 | 60 | 60 | 80 |
| Cation-polymerizable compound represented by formula (17) | 20 | 20 | 20 |  |  |  | 20 | 20 |  |
| Epikote 828*¹ |  |  |  |  |  | 30 |  |  |  |
| 3-Ethyl-3-hydroxymethyloxetane | 20 | 50 | 20 |  |  | 20 |  |  |  |
| 3-Ethyl-3-allyloxymethyloxetane |  |  |  | 20 |  |  |  |  |  |
| Oxetane compound represented by formula (16) |  |  |  |  | 20 |  |  |  |  |
| TONE 0305*² |  |  |  | 10 | 10 |  |  |  | 10 |
| Cyracure UVI 6990 | 6 | 6 |  | 6 | 6 | 6 | 4.8 |  | 4.8 |
| Cyracure UVI 6974*³ |  |  | 4 |  |  |  |  | 3.2 |  |
| Fatty acid ester wax (a) | 1 | 1 | 1 |  |  | 1 | 1 | 1 |  |
| Fatty acid ester wax (b)*⁴ |  |  |  | 1 | 1 |  |  |  | 1 |
| Paint Additive M | 0.2 | 0.2 | 0.2 |  |  | 0.2 | 0.2 | 0.2 |  |
| BYK 300*⁵ |  |  |  | 0.2 | 0.2 |  |  |  | 0.2 |

*¹Epikote 828: a bisphenol type epoxy resin having an epoxy equivalents of 190 and a number-average molecular weight of 350, a product of Yuka Shell Epoxy K. K.
*²TONE 0305: a triol compound which is an adduct between a trihydric alcohol and ε-caprolactone, a product of Union Carbide Corporation of U.S.
*³Cyracure UVI 6974: a photo- and cation-polymerization initiator having antimonate anion ($SbF_6^-$), a product of Union Carbide Corporation of U.S.
*⁴Fatty acid ester wax (b): a fatty acid ester wax obtained by reacting 1 mole of a hexaglycerine ether (which is a polyglycerine having a polymerization degree of 6 and which has 8 hydroxyl groups in the mole) and 6 moles of lauric acid.
*⁵BYK 300: a silicon-based wax, a product of BYK Chemie Co.

diameter =3/16 in. steel ball, load =1 kg and frictional speed =7 reciprocations/min. Times of friction required for the first appearance of mar on the coating film of the test plate was measured. When no mar appeared in 50 times, mar resistance was expressed as >50.

Adhesivity: 100 squares of 1.5 mm×1.5 mm were formed on the coated side of a coated plate for testing, in accordance with JIS K 5400 8.5.2 (1990) (cross-cutting and taping method). On these squares was adhered a pressure-sensitive adhesive tape; the tape was peeled quickly; and the condition of the squares was evaluated according to the following yardstick.

⊚: No film peeling is seen.
○: Film was removed slightly at the square periphery.
Δ: Film was removed slightly at the square periphery and other place(s).

X: Considerable film peeling is seen.

20° gloss: The 20° specular reflectivity of a coated plate for testing was measured.

In-retort extraction: A coated plate for testing was immersed in deionized water and heat-treated at 125° for 30 minutes in an autoclave. Then, reduction (%) in film weight of test plate was measured. Film appearance: The appearance of the coating film formed on the PET steel plate was evaluated visually according to the following yardstick.

○: There is no reduction in luster.
Δ: There is slight reduction in luster.
X: There is considerable reduction in luster.

Test results
Shown in Table 2 and Table 3.

TABLE 2

(Amount of ultraviolet light applied: 100 mJ/cm²)

| Substrate | | Examples | | | | | | Comparative Examples | | | |
|---|---|---|---|---|---|---|---|---|---|---|---|
| | | 1 | 2 | 3 | 4 | 5 | 6 | 1 | 2 | 3 | 4 |
| TFS | Pencil hardness | H | H | H | H | 2H | H | HB | H | H | H |
| | Impact resistance | ○ | ○ | ○ | ○ | ○ | ○ | Δ | X | X | Δ |
| | Mar resistance | 22 | 25 | 23 | 18 | 30 | 16 | 8 | 6 | 4 | 10 |
| | Adhesivity | ○ | ○ | ○ | Δ | Δ | Δ | X | X | X | X |
| PET- laminated steel plate | Pencil hardness | H | F | H | H | 2H | F | HB | HB | F | F |
| | Impact resistance | ○ | ○ | ○ | ○ | ○ | ○ | X | X | X | Δ |
| | Mar resistance | 42 | 38 | 40 | 25 | 42 | 20 | 11 | 9 | 2 | 15 |
| | Adhesivity | ○ | ○ | ○ | ○ | ○ | ○ | X | X | X | X |
| | 20° Gloss | 84 | 82 | 85 | 79 | 87 | 78 | 75 | 72 | 73 | 78 |
| | In-retort extraction | 4.5 | 6.1 | 3.7 | 4.2 | 2.2 | 3.9 | 22.3 | 20.4 | 19.6 | 4.5 |
| | Film appearance | ○ | ○ | ○ | ○ | ○ | ○ | Δ | Δ | Δ | Δ |

TABLE 3

(Amount of ultraviolet light applied: 150 mJ/cm²)

| Substrate | | Examples | | | | | | Comparative Examples | | | |
|---|---|---|---|---|---|---|---|---|---|---|---|
| | | 1 | 2 | 3 | 4 | 5 | 6 | 1 | 2 | 3 | 4 |
| TFS | Pencil hardness | 3H | 4H | 4H | 4H | 4H | 3H | 2H | 2H | 2H | 3H |
| | Impact resistance | ⊚ | ⊚ | ○ | ⊚ | ⊚ | ○ | ○ | Δ | X | ○ |
| | Mar resistance | >50 | >50 | 32 | 35 | >50 | 30 | 17 | 19 | 8 | 15 |
| | Adhesivity | ○ | ⊚ | ○ | ○ | ○ | ○ | Δ | Δ | ○ | ○ |
| PET- laminated steel plate | Pencil hardness | 3H | 3H | 3H | 3H | 3H | 2H | H | H | H | 3H |
| | Impact resistance | ⊚ | ⊚ | ○ | ⊚ | ⊚ | ○ | Δ | Δ | X | ○ |
| | Mar resistance | >50 | >50 | 45 | >50 | >50 | 35 | 25 | 18 | 11 | 20 |
| | Adhesivity | ⊚ | ⊚ | ⊚ | ○ | ○ | ⊚ | Δ | Δ | Δ | ○ |
| | 20° Gloss | 84 | 82 | 84 | 80 | 89 | 80 | 71 | 74 | 75 | 80 |
| | In-retort extraction | 3.2 | 3.5 | 3.0 | 2.9 | 1.8 | 2.2 | 16.2 | 16.3 | 10.8 | 3.0 |
| | Film appearance | ○ | ○ | ○ | ○ | ○ | ○ | Δ | Δ | Δ | Δ |

Production of ultraviolet-curing coating compositions for cans

EXAMPLE 7

There were mixed 50 parts of 3,4-epoxyoyclohexylmethyl 3,4-epoxyoyolohexanecarboxylate (hereinafter abbreviated to compound A-①); 20 parts of 3-ethyl-3-hydroxymethyloxetane (hereinafter abbreviated to compound B-①); 10 parts of a compound of the formula (12) wherein each of $R^{61}$s is an ethyl group (hereinafter abbreviated to compound B-②); 20 parts of a compound of the formula (4-2) wherein $R^{61}$ is an ethyl group, $R^{71}$ is a p-xylylene group and p is 2 (hereinafter abbreviated to B-③); 6 parts of Cyracure UVI-6990 (a photo- and cation-polymerization initiator having $PF_6^-$, a product of Union Carbide Corporation of U.S.); 1 part of a fatty acid ester wax (a) obtained by reacting 1 mole of decaglycerine ether (which is a polyglycerine having a polymerization degree of 10 and which has 12 hydroxyl groups in the molecule) and 10 moles of lauric acid; and 0.2 part of Paint Additive M (a silicon-based wax, a product of Dow Corning Corporation). The mixture was stirred at 50° C. for 20 minutes to obtain an ultraviolet-curing coating composition for cans.

EXAMPLES 8-14

Comparative Example 5

Operations were conducted in the same manner as in Example 7 except that the components shown in Table 4 were used in the proportions shown in Table 4, whereby various ultraviolet-curing coating compositions for cans were obtained.

Production process

In a flask were placed 3,540 parts of deionized water and 51 parts of Eleminol JS-2 (an aqueous solution containing 39% of an allyl group-containing anionic reactive emulsifier of sulfosuccinic acid type, a product of Sanyo Chemical Industries, Ltd.). The mixture was heated to 90° C. with stirring. Thereto was added 20% of an aqueous polymerization initiator solution obtained by dissolving 12.5 parts of 2,2'-azobis[2-methyl-N-(2-hydroxyethyl)-propionamide] in 500 parts of deionized water. Then, there was added 5% of a monomers mixture consisting of 470 parts of styrene, 470 parts of n-butyl acrylate and 60 parts of 1,6-hexanediol diacrylate. The mixture was stirred for 30 minutes. Thereafter, the dropwise addition of the remaining monomers mixture and the remaining aqueous polymerization initiator solution was started. The dropwise addition of the monomers mixture was conducted in 3 hours, and the dropwise addition of the aqueous polymerization initiator solution was conducted in 3.5 hours. During the addition, the polymerization temperature was kept at 90° C. After the completion of the dropwise addition of the aqueous polymerization initiator solution, the system was kept at 90° C. for 30 minutes. Then, the system was cooled to room temperature to obtain an aqueous dispersion of polymer fine particles which were internally crosslinked three-dimensionally. The dispersion had a solid content of about 20%.

Preparation of coated plates for testing and test results

Using each of the coating compositions obtained in Examples 7-14 and Comparative Example 5, coated plates for testing were prepared and subjected to testing. The results are shown in Table 5 and Table 6.

TABLE 4

| Components | Examples | | | | | | | | Comparative Example |
|---|---|---|---|---|---|---|---|---|---|
|  | 7 | 8 | 9 | 10 | 11 | 12 | 13 | 14 | 5 |
| Compound A-① | 50 | 50 | 30 | 30 | 70 | 70 | 50 | 50 | 90 |
| Compound A-②*1 |  | 10 | 10 | 10 |  |  |  |  | 10 |
| Compound B-① | 20 | 20 | 5 | 5 | 25 | 25 | 20 | 20 |  |
| Compound B-② | 10 |  |  |  |  |  | 10 | 10 |  |
| Compound B-④*2 |  |  | 55 | 55 | 5 | 5 |  |  |  |
| Compound B-③ | 20 | 20 |  |  |  |  | 20 | 20 |  |
| TONE 0305*3 |  |  | 10 | 10 |  | 10 |  |  | 10 |
| Cyracure UVI 6990 | 6 | 6 | 6 |  | 6 | 6 | 6 | 6 | 6 |
| Cyracure UVI 6974*4 |  |  |  | 4 |  |  |  |  |  |
| Denarex R-45EPI*5 |  |  |  |  |  |  |  | 10 |  |
| Organic resin fine particles (b)*6 |  |  |  |  |  |  |  |  | 5 |
| Fatty acid ester wax (a) | 1 | 1 | 1 | 1 | 1 | 1 | 1 | 1 | 1 |
| Paint Additive M | 0.2 | 0.2 | 0.2 | 0.2 | 0.2 | 0.2 | 0.2 | 0.2 | 0.2 |

*¹Compound A-②: 3,4-epoxycyclohexylmethyl alcohol
*²Compound B-④: a compound of the formula (15) wherein $R^{61}$ is an ethyl group and $R^{13}$ is a glycidyl group.
*³TONE 0305: a triol compound which is an adduct between a trihydric alcohol and ε-caprolactone, a product of Union Carbide Corporation of U.S.
*³Cyracure UVI 6974: a photo- and cation-polymerization initiator having antimonate anion ($SbF_6^-$), a product of Union Carbide Corporation of U.S.
*⁵Denarex R-45EPI: an epoxidized polybutadiene resin, a product of Nagase Chemicals Ltd.
*⁶Organic resin fine particles (b): An aqueous dispersion of polymer fine particles, obtained by the following production process was placed on a stainless steel vat and dried in an electric hot air drier of 60° C. The resulting solid resin was ground to obtain organic resin fine particles (b) having particle diameters of about 80 μm.

TABLE 5

(Amount of ultraviolet light applied: 100 mJ/cm²)

| Substrate | | Examples | | | | | | | | Comparative Example |
|---|---|---|---|---|---|---|---|---|---|---|
| | | 7 | 8 | 9 | 10 | 11 | 12 | 13 | 14 | 5 |
| TFS | Pencil hardness | 4H | 4H | 5H | 5H | 3H | 3H | 4H | 4H | 2H |
| | Impact resistance | ⊙ | ⊙ | ⊙ | ○ | ⊙ | ○ | ⊙ | ⊙ | Δ |
| | Mar resistance | >50 | >50 | >50 | >50 | 45 | 35 | >50 | >50 | 15 |
| | Adhesivity | ⊙ | ⊙ | ⊙ | ⊙ | ○ | ○ | ⊙ | ⊙ | Δ |
| PET-laminated steel plate | Pencil hardness | 3H | 3H | 3H | 3H | 3H | 2H | 3H | 3H | H |
| | Impact resistance | ⊙ | ⊙ | ○ | ○ | ⊙ | ○ | ⊙ | ⊙ | Δ |
| | Mar resistance | >50 | >50 | >50 | >50 | >50 | >50 | >50 | >50 | 22 |
| | Adhesivity | ○ | ○ | ⊙ | ⊙ | ○ | ○ | ⊙ | ⊙ | Δ |
| | 20° Gloss | 88 | 86 | 90 | 88 | 89 | 85 | 86 | 88 | 73 |
| | In-retort extraction | 3.0 | 3.1 | 2.9 | 3.3 | 3.5 | 3.2 | 2.5 | 3.2 | 18.2 |
| | Film appearance | ○ | ○ | ○ | ○ | ○ | ○ | ○ | ○ | Δ |

TABLE 6

(Amount of ultraviolet light applied: 150 mJ/cm²)

| Substrate | | Examples | | | | | | | | Comparative Example |
|---|---|---|---|---|---|---|---|---|---|---|
| | | 7 | 8 | 9 | 10 | 11 | 12 | 13 | 14 | 5 |
| TFS | Pencil hardness | 4H | 4H | 5H | 5H | 4H | 4H | 4H | 4H | 2H |
| | Impact resistance | ⊙ | ⊙ | ⊙ | ⊙ | ⊙ | ⊙ | ⊙ | ⊙ | ○ |
| | Mar resistance | >50 | >50 | >50 | >50 | >50 | >50 | >50 | >50 | 35 |
| | Adhesivity | ⊙ | ⊙ | ⊙ | ⊙ | ⊙ | ⊙ | ⊙ | ⊙ | Δ |
| PET-laminated steel plate | Pencil hardness | 3H | 3H | 4H | 3H | 3H | 3H | 3H | 3H | 2H |
| | Impact resistance | ⊙ | ⊙ | ⊙ | ⊙ | ⊙ | ⊙ | ⊙ | ⊙ | Δ |
| | Mar resistance | >50 | >50 | >50 | >50 | >50 | >50 | >50 | >50 | >50 |
| | Adhesivity | ⊙ | ⊙ | ⊙ | ⊙ | ⊙ | ⊙ | ⊙ | ⊙ | Δ |
| | 20° Gloss | 93 | 92 | 90 | 89 | 90 | 87 | 88 | 88 | 75 |
| | In-retort extraction | 1.6 | 1.8 | 2.2 | 2.5 | 2.7 | 2.6 | 1.8 | 1.5 | 9.7 |
| | Film appearance | ○ | ○ | ○ | ○ | ○ | ○ | ○ | ○ | ○ |

What is claimed is:

1. An ultraviolet-curing coating composition for cans, which comprises:
   (A) a cation-polymerizable compound,
   (B) a combination of the following oxetane compounds:
      (B-1) a compound having, in the molecule, at least one oxetane ring and at least one hydroxyl group, and
      (B-2) a compound having, in the molecule, at least two oxetane rings, or an oxetane ring and an epoxy group,
   (C) a cationic initiator which generates a cation when irradiated with ultraviolet rays, and
   (D) a lubricity-imparting agent, wherein the proportions of the individual components are:
      (A) 1–99 parts by weight,
      (B) 1–99 parts by weight,
      (C) 0.01–20 parts by weight per 100 parts by weight of the total of (A) and (B), and
      (D) 0.01–10 parts by weight per 100 parts by weight of the total of (A) and (B),
   and wherein the proportions of the compound (B-1) and the compound (B-2) are each 5–60 parts by weight per 100 parts by weight of the total of the compounds (A) and (B).

2. The coating composition according to claim 1, wherein the cation-polymerizable compound (A) is a compound having an epoxy group(s).

3. The coating composition according to claim 1, wherein the cation-polymerizable compound (A) is a compound having an alicyclic epoxy group(s) in the molecule.

4. The coating composition according to claim 3, wherein the compound having an alicyclic epoxy group(s) in the molecule is selected from the group consisting of dicyclopentadiene dioxide, limonene dioxide, di(3,4-epoxycyclohexyl) adipate, (3,4-epoxycyclohexyl)methyl 3,4-epoxycyclohexanecarboxylate, (3,4-epoxy-6-methylcyclohexyl)methyl 3,4-epoxy-6-methylcyclohexanecarboxylate, ethylene-1,2-di (3,4-epoxycyclohexanecarboxylic acid) ester and the compounds represented by the following formula (1), (2) or (3):

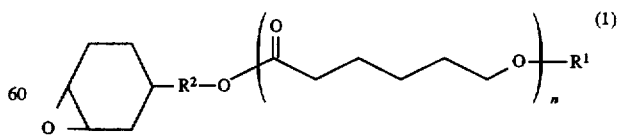

wherein $R^1$ is a hydrogen atom, an alkyl group of 1–8 carbon atoms which may have an epoxy group(s), or an acyl group of 1–12 carbon atoms which may have an epoxy group(s); $R^2$ is an alkylene group of 1–6 carbon atoms; and n is an integer of 0–15,

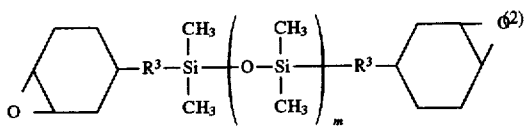

wherein two $R^3$s may be the same or different and are each independently an alkylene group of 1–6 carbon atoms; and m is an integer of 0–25,

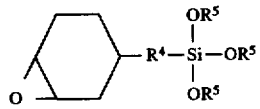

wherein $R^4$ is an alkylene group of 1–6 carbon atoms; and three $R^5$s may be the same or different and are each independently an alkyl group of 1–4 carbon atoms.

5. The coating composition according to claim 1, wherein the compound (B-1) is a compound represented by the following formula (4-1):

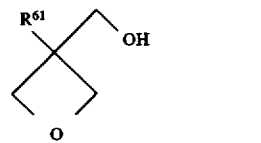

wherein $R^{61}$ is a hydrogen atom, a fluorine atom, a straight chain or branched chain alkyl group of 1–6 carbon atoms, a straight chain or branched chain fluoroalkyl group of 1–6 carbon atoms, or an allyl group.

6. The coating composition according to claim 1, wherein the cationic initiator (C) is a compound having hexafluorophosphate anion ($PF_6^-$).

7. A coating composition according to claim 1, wherein the lubricity-imparting agent (D) is at least one wax selected from silicon waxes and fatty acid ester waxes which are each an ester between a polyol compound(s) and a fatty acid(s).

8. The coating composition according to claim 1, which further comprises an epoxidized polybutadiene resin in an amount of 0.1–50 parts by weight of the total of the compounds (A) and (B).

9. A coating compound according to claim 1, which further comprises organic resin fine particles in an amount of 0.1–50 parts by weight per 100 parts by weight of the total of the compounds (A) and (B).

10. The coating composition according to claim 1, wherein the compound (B-2) is selected from the group consisting of the compounds represented by the following formula (4-2), (12), (13), (14) or (15):

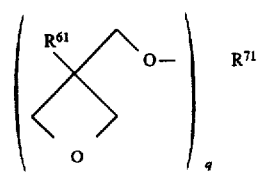

wherein $R^{61}$ is a hydrogen atom, a fluorine atom, a straight chain or branched chain alkyl group of 1–6 carbon atoms, a straight chain or branched chain fluoroalkyl group of 1–6 carbon atoms, or an allyl group; $R^{71}$ is a bi- to tetravalent organic group; and q is an integer of 2–4.

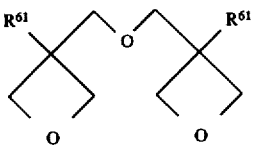

wherein two $R^{61}$s may be the same or different and each have the same definition as given above,

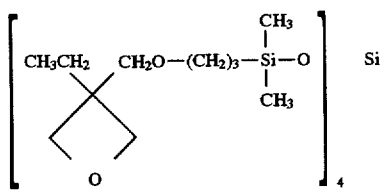

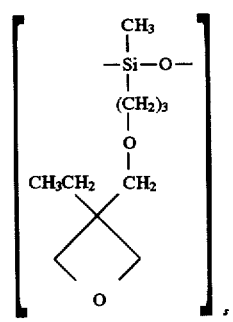

wherein s is an integer of 25–200.

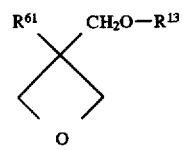

wherein $R^{13}$ is an epoxy group-containing group; and $R^{61}$ has the same definition as given above.

11. The process for producing a coated metal can, which comprises coating an ultraviolet-curing coating composition for cans, set forth in claim 1, on a metal plate, a resin film-laminated metal plate or a metal can obtained by molding of said plate and irradiating the resulting plate or can with ultraviolet rays to cure the coated composition.

* * * * *